(12) United States Patent
Foster et al.

(10) Patent No.: US 6,767,433 B2
(45) Date of Patent: Jul. 27, 2004

(54) SYSTEM AND METHOD FOR SOLAR DISTILLATION

(75) Inventors: Robert E. Foster, Mesilla Park, NM (US); Michael J. Cormier, Chaparral, NM (US); Gregory R. Vogel, Las Cruces, NM (US)

(73) Assignee: SolAqua, Inc., El Paso, TX (US)

( * ) Notice: Subject to any disclaimer, the term of this patent is extended or adjusted under 35 U.S.C. 154(b) by 67 days.

(21) Appl. No.: 09/845,359

(22) Filed: May 1, 2001

(65) Prior Publication Data

US 2002/0162734 A1 Nov. 7, 2002

(51) Int. Cl.⁷ ............................................. B01D 3/00
(52) U.S. Cl. ............ 202/234; 159/903; 159/DIG. 15; 202/267.1; 210/295; 220/560.08; 220/560.12; 220/567.3
(58) Field of Search .................. 203/10, 100, 86, 203/DIG. 1; 202/234, 267.1; 159/903, DIG. 15; 210/295; 220/560.12, 560.08, 567.3

(56) References Cited

U.S. PATENT DOCUMENTS

| | | | |
|---|---|---|---|
| 4,010,080 A | 3/1977 | Tsay et al. ..................... 202/83 |
| 4,055,473 A | 10/1977 | Hay .......................... 202/234 |
| 4,077,849 A | 3/1978 | Ziehm, Jr. .................. 202/205 |
| 4,135,985 A | 1/1979 | La Rocca ................... 202/176 |
| 4,137,901 A | 2/1979 | Maier ........................ 126/271 |
| 4,138,293 A | 2/1979 | Ziehm, Jr. .................. 202/180 |
| 4,141,798 A | 2/1979 | Grosse ....................... 202/234 |
| 4,172,767 A | 10/1979 | Sear ........................... 202/182 |
| 4,227,970 A | 10/1980 | Howell, Jr. et al. .......... 202/234 |
| 4,235,679 A | 11/1980 | Swaidan ..................... 202/234 |
| 4,267,021 A | 5/1981 | Speros et al. ............... 202/176 |
| 4,420,375 A | 12/1983 | Husson ....................... 202/234 |
| 4,440,861 A | 4/1984 | McCarthy .................. 435/306 |
| 4,487,659 A | 12/1984 | Stark ........................... 202/172 |
| 4,527,543 A * | 7/1985 | Denton ....................... 122/19.2 |
| 4,606,794 A | 8/1986 | Wyckoff ..................... 202/173 |
| 4,620,900 A * | 11/1986 | Kimura et al. ............... 202/172 |
| 4,756,802 A | 7/1988 | Finney ........................ 202/172 |
| 4,853,088 A | 8/1989 | Conway ...................... 203/10 |
| 4,966,655 A | 10/1990 | Wilkerson, Jr. ............. 202/234 |
| 5,316,626 A | 5/1994 | Guy ............................. 203/10 |
| 5,338,383 A * | 8/1994 | Polackowyj ................. 156/80 |
| 5,468,351 A | 11/1995 | Hirota et al. ................ 202/234 |
| 5,628,879 A | 5/1997 | Woodruff .................... 202/234 |
| 5,969,087 A | 10/1999 | Maeda ........................ 528/353 |
| 6,001,222 A | 12/1999 | Klein .......................... 202/234 |
| 6,440,275 B1 * | 8/2002 | Domen ....................... 202/234 |

* cited by examiner

*Primary Examiner*—Virginia Manoharan
(74) *Attorney, Agent, or Firm*—Wolff & King, PLLC; Kevin Alan Wolff

(57) ABSTRACT

The present invention is directed to an improved solar powered distillation system and method. The solar powered still may have a waterproof membrane that is extruded, molded, or sprayed-on. The membrane may be installed in a lightweight basin as a liner resulting in improved ease of still manufacturing and assembly as well as improved sealing. Further, the membrane may include silicone. In a preferred embodiment, the membrane material may be an opaque food grade non-toxic odorless, tasteless silicon, for example, Dow Corning 40. In one variation, the solar still basin may be formed from an aluminum sided insulation material. In another variation the solar still may include a carbon filter attached to either the input or output of the solar still for filtering out VOCs. The solar still may further include adjustable legs that facilitate leveling the still to ensure the most efficient operation possible. The still may be provided to users in a kit and assembled on site to improve shipping. As constructed and used, the solar still of the present invention may be used as a portable cost effective means of providing distilled water in any location throughout the world.

25 Claims, 9 Drawing Sheets

SYSTEM AND METHOD FOR SOLAR DISTILLATION

TECHNICAL FIELD

The invention relates generally to solar energy methods and systems, and particularly with systems and methods for solar energy distillation.

BACKGROUND OF THE INVENTION

Solar energy is a free renewable energy source that is readily available in many parts of the world. Given that solar energy is readily available to all for merely the cost of equipment to convert it to an intended purpose, solar energy may be particularly attractive for use in areas with populations that have limited financial resources. Technological developments have resulted in the use of solar energy for many applications, for example, thermal heating systems, electricity production systems, and solar distillation systems.

Solar distillation systems (also referred to herein as "solar distillers," "solar stills," "single basin or multiple effect stills," or simply "stills") have been in use since 1872. Some examples may be found with reference to various patents including: U.S. Pat. Nos. 5,628,879; 4,135,985; 4,141,798; 4,487,659; and 4,267,021. Unfortunately, many of these prior art still designs suffer from various deficiencies so that they do not provide a practical solution for providing clean and safe drinking water to the masses of people throughout the world who have limited knowledge about solar energy distillation systems and finances. For example, many of the known stills are difficult and/or expensive to construct or purchase. In fact, in some areas of the world proper and safe building materials for building stills are not available. Some stills are often difficult to construct, difficult to move, not durable, and/or difficult to maintain.

One particular application of solar distillation systems is water distillation. In many geographical locations of the world clean and safe potable drinking water is expensive and/or in scarce supply. Often the available water supply is salty, brackish, and/or contaminated with various undesirable and possibly toxic substances which results in water that may not be suitable for human and/or animal consumption. These geographical locations are often remote and might not have common utilities such as electricity and/or effective public water purification systems. Further, the people who inhabit these locations may not have enough money to be able to afford public water or continuous electric utility cost. As a result they often resort to purchasing bottle water for drinking and cooking purposes. However, a properly designed and operated solar still as provided by the present invention may be a preferred alternative to purchasing bottled water by providing many years of clean safe good tasting water production to these people. Such a solar still may be extremely effective in providing clean drinking water from a high dissolved salt and other mineral content water, effective at eliminating dangerous bacteria such as cholera, E. coli, etc, cost effective, easy to install, and easy to maintain. Although many solar still designs are not always capable of effectively removing volatile organic compounds (VOC) such as pesticides, or petroleum distillates.

In one type of solar still the still basin may be sealed with a variety of materials, including silicone, so as to retain the liquid solution to be distilled. The basin sealing materials are applied to a rigid basin structural material or insulation material as a coating of material in liquid form that dries and adheres to a rigid basin structural material so as to seal the basin for retaining, for example, water. For example, the solar still basin structural material may be a cement, concrete or wood material and one or more layers of silicon may be manually spread over the surface of the basin or an insulation lined basin to seal the basin structural material from the liquid (e.g., water) to be distilled. This sealing layer(s) may be referred to as the "membrane" or "diaphragm" of the still. However, manual application of the silicon is a cumbersome process and it is difficult to ensure an adequate seal in all locations of the basin due to the inaccuracy of the manual spreading process. Fumes from the silicon application can be toxic and cause people to become faint or nauseated. Further, some types of silicon used may break down and contaminate the water, resulting in contaminated distillate.

SUMMARY OF THE INVENTION

The present invention is directed to an improved solar powered distillation system and method that can be provided, cost effectively, to the masses of people worldwide. The improved solar powered distillation system may be made of lightweight, cost effective, and durable materials (e.g., aluminum) and construction to ensure a low cost still that is easily transportable (moveable), affordable and durable so as to provide years of safe clean water production for people at any location throughout the world. The solar powered still may have a waterproof membrane that is extruded, molded, and/or spray-on and installed in a lightweight basin as a liner for improved ease of still manufacturing and assembly as well as improved sealing. Further, the membrane may include silicone. In a preferred embodiment, the membrane material may be an opaque food grade non-toxic odorless, tasteless silicon, for example, Dow Corning 40/Silicone FDA Ingredients per CFR 177.2600. In one variation, the solar still basin may be formed from an aluminum sided insulation material, for example, Thermax made by Celotex. In another variation the solar still may also include a carbon filter attached to either the input or output of the solar still for filtering out VOCs. In a further variation the solar still may include adjustable legs to facilitate leveling the still to ensure the most efficient operation possible. In one preferred application, the solar still may be used as a solar water purification system and method. The still may be provided to users in kit form and assembled on location where it is to be used. In any case, the still is a portable cost effective system that may be used to provide distilled water in any location throughout the world.

DESCRIPTION OF THE PREFERRED EMBODIMENTS

Although solar powered distillation systems have been know for some time, a low cost, lightweight, easy to assemble, portable still with good reliability has not been available until the creation of the present invention. As such, until now low cost high volume production of solar power distillation systems has not been viable. The present invention uses a unique set of materials and assembly processes, along with offering a unique method of still operation, to provide a low cost, lightweight, easy to assemble, durable and reliable solar power distillation system that may be sold, shipped to, and used at any location (including remote locations) throughout the world. A preferred application for the solar distillation system of the present invention is water distillation for providing clean safe drinking water. However, the present invention may also be used for other distillations and even for heating liquids (e.g., producing hot water).

Figure 1:
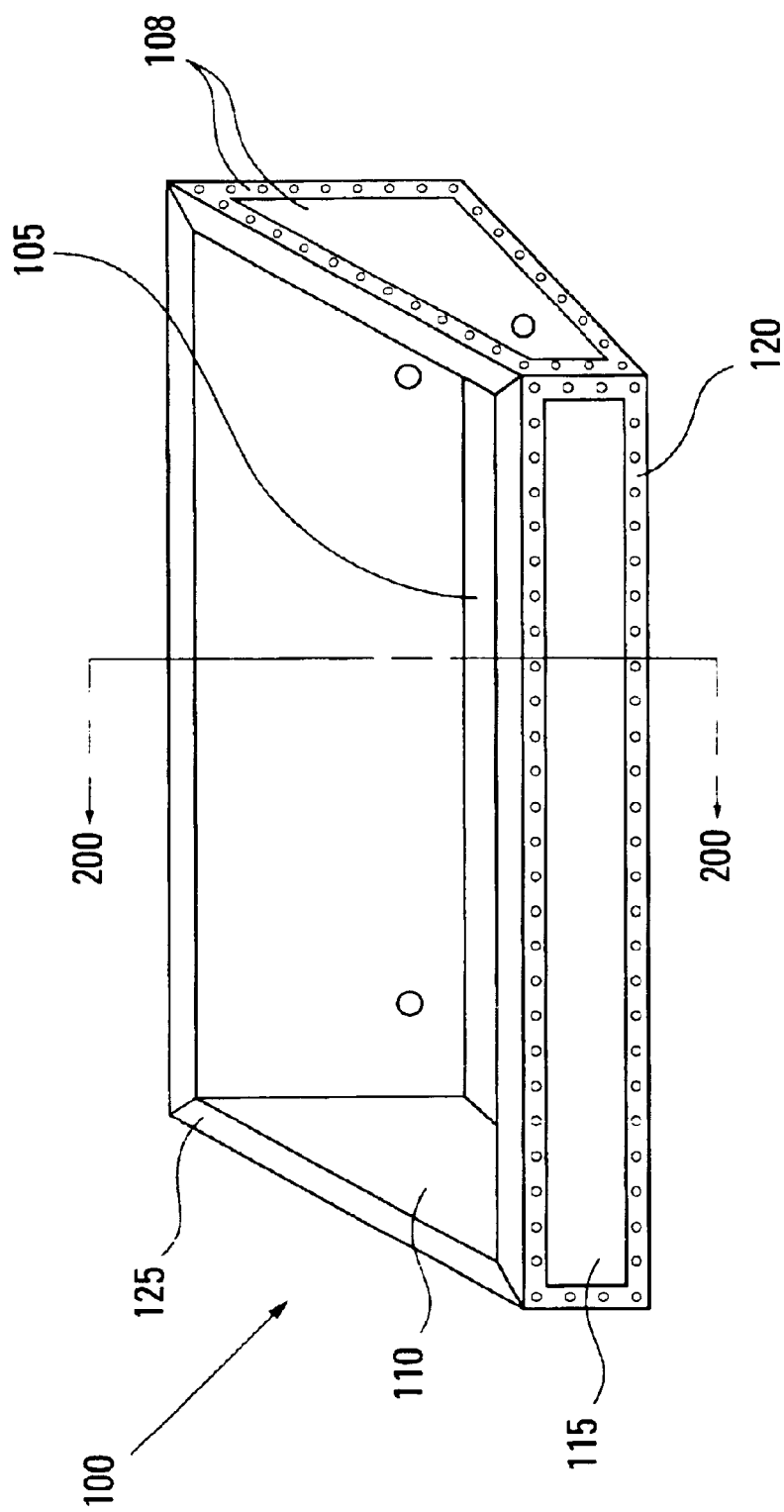
FIG. 1 is a perspective view of an exemplary solar powered distillation system, according to the present invention.

Referring now to FIG. 1, a perspective view of one exemplary embodiment for the solar powered distillation system according to the present invention is provided. The solar powered distillation system 100 includes a basin 105 that may include a basin casing 108 and an impermeable membrane 110 lining the interior surfaces of the basin casing 108. The basin casing 108 may include a structurally rigid and durable outside surface material 115, for example aluminum, lined with an insulation material. Further, the basin casing 108 exterior may be trimmed on its edges and corners with strengthening members 120, preferably made of, for example, aluminum. The exterior of the basin casing 108 is preferably made of durable materials that will hold up to harsh climate conditions including extreme heat (e.g., desert operation). The interior surface of the basin 105 serves at least two distinct purposes: retaining the liquid to be distilled and absorbing sunlight during distillation. Further, the membrane 110 should be easily assembled into the basin 105. As such, in a preferred embodiment the membrane 100 may be made of an opaque material which is extruded as a sheet or molded into the form of the basin 105. In distilled water applications the membrane is preferably made of food grade materials so as to provide safe drinking water that tastes good. One such material may be a blackened silicone, for example, Dow Corning 40/Silicone FDA ingredients per CFR 177.2600, extruded into a sheet and attached to the interior surface of the basin casing 108. Another such material may be Dow Corning 999-A. It is important that the material have a long service life and does not degrade in the presence of ultraviolet rays from the sun. The use of a dark or blackened silicone will help improve absorption of the sun's rays so as to increase the heating of the solar powered distillation system and distillation production.

The solar powered distillation system may be closed by covering the basin 100 with a piece of glass (not shown). The glass may be preferably a tempered glass and be attached to the sill 125 on the basin 105. The glass should seal the basin to produce a sealed solar powered distillation system 100 that retains as much solar heat as possible. In one preferred embodiment the glass may be attached to the basin sill 125 with food grade silicon, for example, Dow Corning 999-A. Similarly, the glass may be clamped down or placed in a sliding sleeve.

Figure 2:
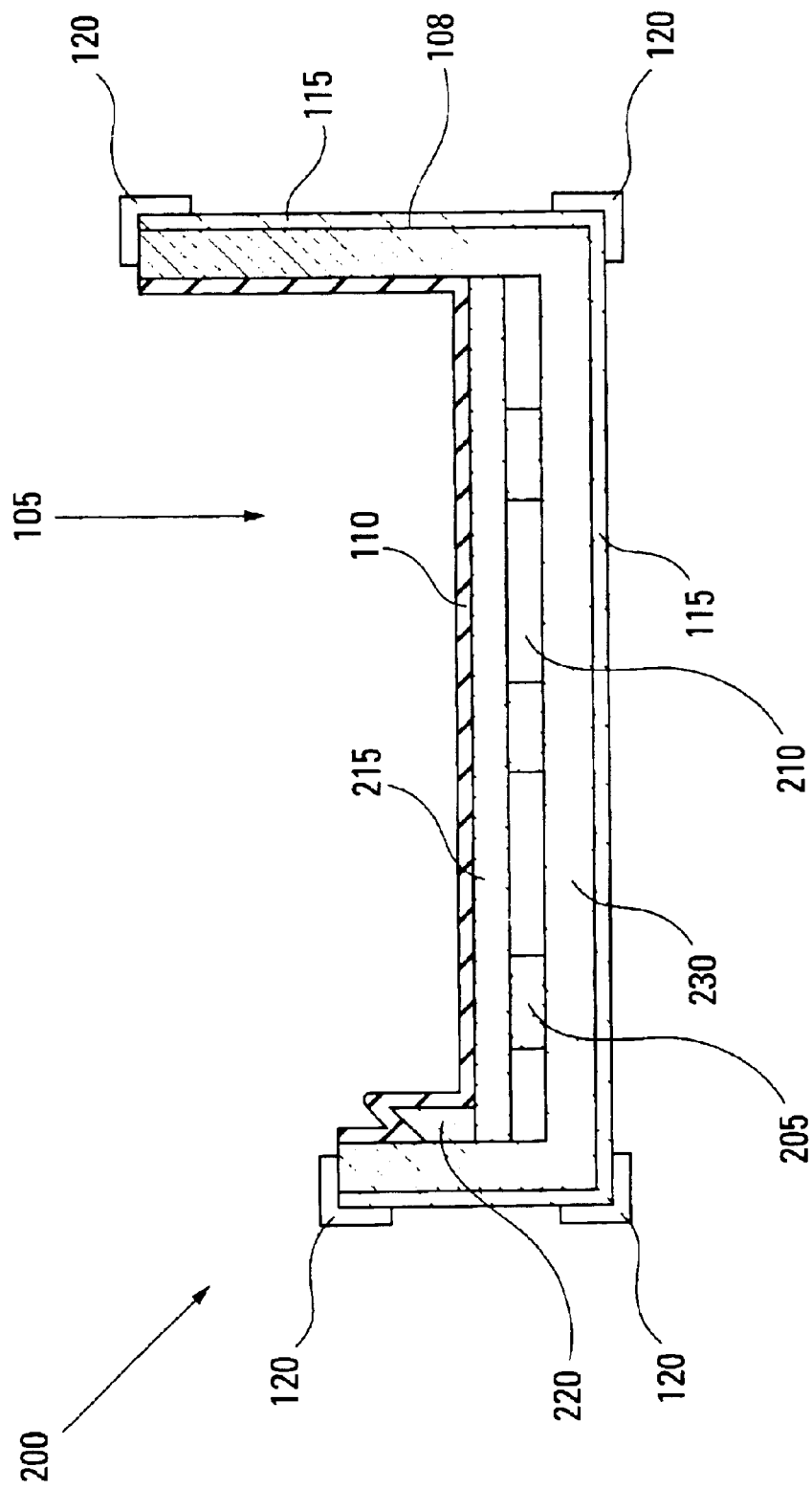
FIG. 2 is a cross section view of an exemplary solar powered distillation system, according to one embodiment of the present invention.

Referring now to FIG. 2, a cross section view taken at line 200 of FIG. 1 is provided for one preferred embodiment. In this embodiment, the basin casing 108 is formed of a thin aluminum sheet 115 bonded to an insulation material 110 as shown. The exterior corners of the basin casing 108 are trimmed with angled structural support members 120 that are preferably made of aluminum. Additional insulation strips 205 may be attached to insulation 110 using, for example, silicon. Another layer of insulation 215 may then be attached to insulation strips 205 using, for example, silicon. As a result the bottom of the basin contains an intermediate layer of air 210 and insulation 205 which will improve the insulating characteristics of the basin 105 because most heat is radiated at the bottom of the basin 105. Another strip of insulation, the distillate collection trough 220, is attached to the short front side wall of the basin 105 and channels the distillate that condenses on the glass cover to an output port (not shown). The various insulation layers may be, for example, polyisocyanurate. In any case, membrane 110 lines the inside of the basin 105. The membrane is preferably a blackened extruded or molded silicone that may be attached to the walls and floor of the inside of the basin 105 so as to retain the distillate liquid. Although not shown in the Figures, membrane 110 may also overlap the basin casing sill 125 as well as the structural support member 120 on the sill 125. A more detailed description of the basin casing 108 and membrane 110 follows.

Figure 3A:
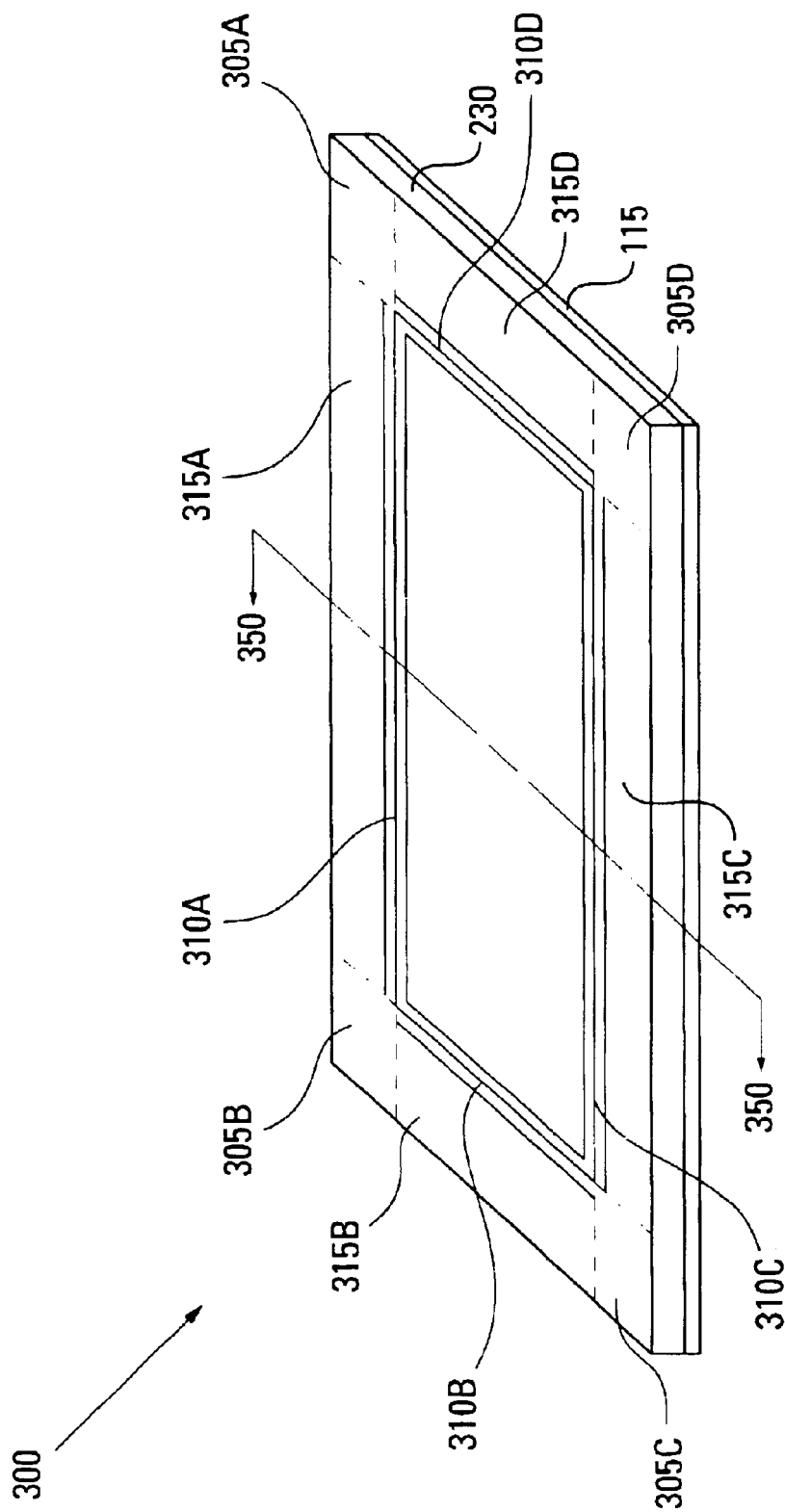
FIG. 3A is a perspective view of an aluminum sided insulation sheet as used and fabricated to form the casing of the still basin, according to one embodiment of the present invention.

FIG. 3A provides one preferred embodiment of the basin casing 108 insulation and siding. As described above, the solar powered distillation system basin casing 108 (without the structural support members 120) may be formed from an aluminum sided insulation sheet 300. A thin layer of pliable aluminum 115 may be adhered to a layer of insulation 110, for example, polyisocyanurate, Styrofoam, etc. The thin layer of aluminum will be the outer surface of the basin casing and provide structural soundness and durability against the outside environment where the still is to be operated. Although the preferred embodiment here is shown with an aluminum outer surface, the material may be any other pliable material, for example a plastic, that exhibits the structural and durability characteristics needed for the still casing. In any case, the basin casing sheet 300 is provided with grooves 310A–310D to allow for portion 315A–315D of the sheet to be folded at a 90 degree angle (perpendicular) to the main surface so as to form the sides of the basin 105. Prior to angling the sides 315A–315D relative to the main surface, the corners of the sheet 300 are eliminated. The sheet 300 may be formed with the corners notched out or the corners may be removed from the rectangular sheet 300 prior to bending the ends 315A–315D up to be perpendicular to the normal flat surface of the sheet 300.

Figure 3B:
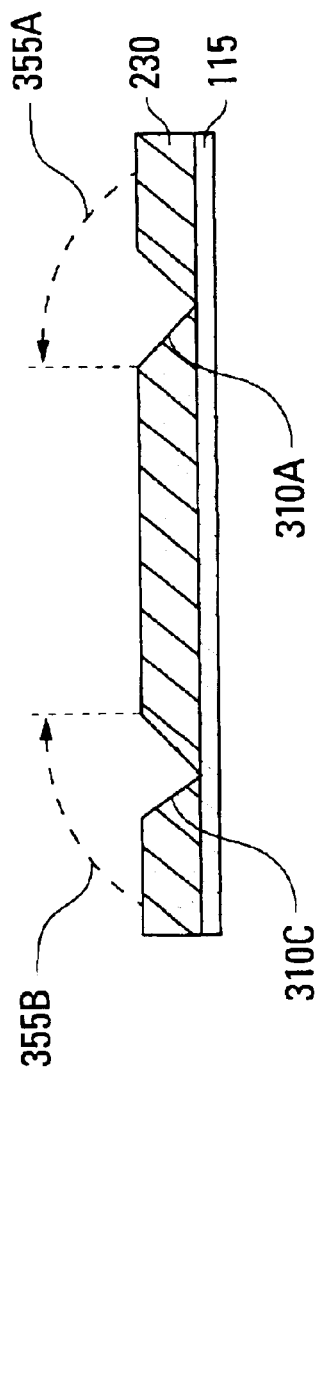
FIG. 3B is a cross section view of the aluminum sided insulation sheet as fabricated for use in forming the casing of the still basin, according to one embodiment of the present invention.

FIG. 3B provides a cross section view of sheet 300 taken across line 350 as fabricated for use in forming the casing of the still basin. As illustrated, the insulation is notched at locations 310A and 310C to enable the sides of the basin 105 to be formed at, for example, a 90 degree angle (bends 355A and 355B) from the single sheet 300. The notches are preferably a 90 degree angle notch that may be formed using a mold during formation of the insulation material 110 or by removing the insulation in these areas (310A and 310C) after a full sheet 300 is formed. In a preferred embodiment sheet 300 is a Celotex building material sheet with aluminum and polyisocyanurate and the grooves 310A–310D are formed in the sheet by, for example, cutting away portions of the polyisocyanurate. In any case, the grooves 310A–310D are formed in the sheet 300, the corners 305A–305D are notched, and the ends 315A–315B are bent up to form sides of the basin 105 that are perpendicular to the bottom surface (aluminum facing outward) of the basin casing 108. This approach provides a cost effective, lightweight, and durable basin casing.

Figure 4A:
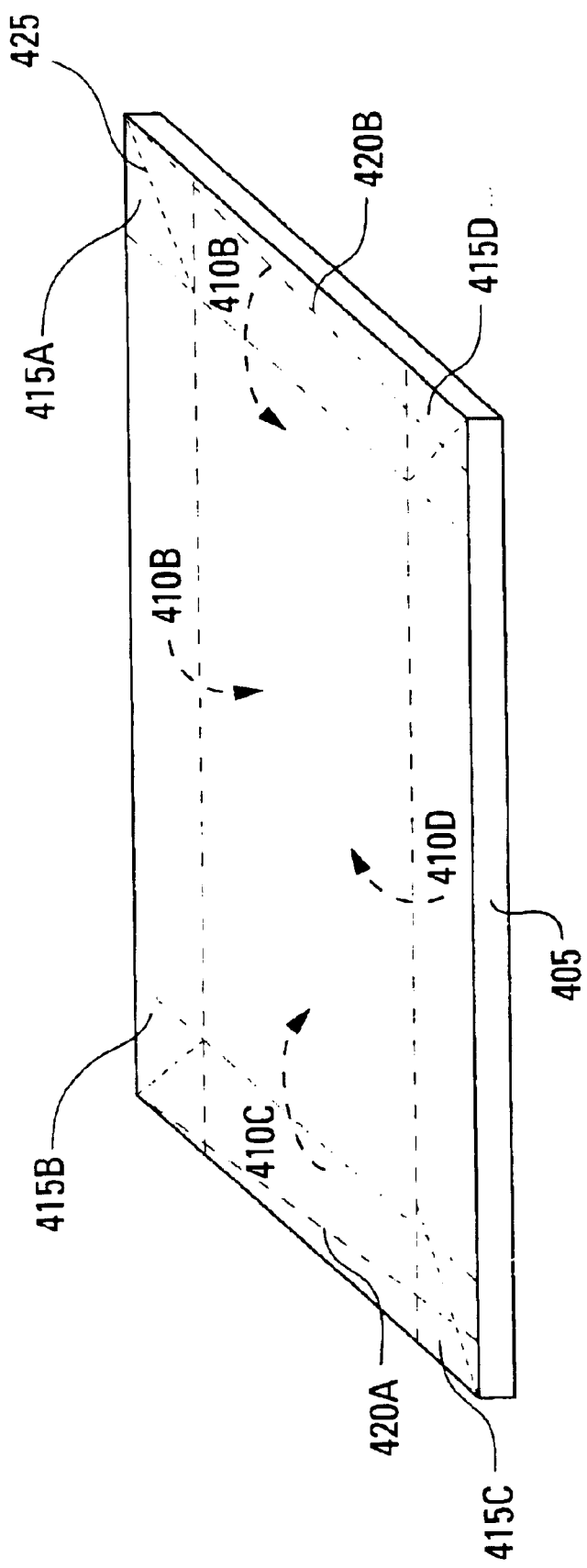
FIG. 4A is a perspective view of an extruded membrane sheet, according to one embodiment of the present invention.
Figure 4B:
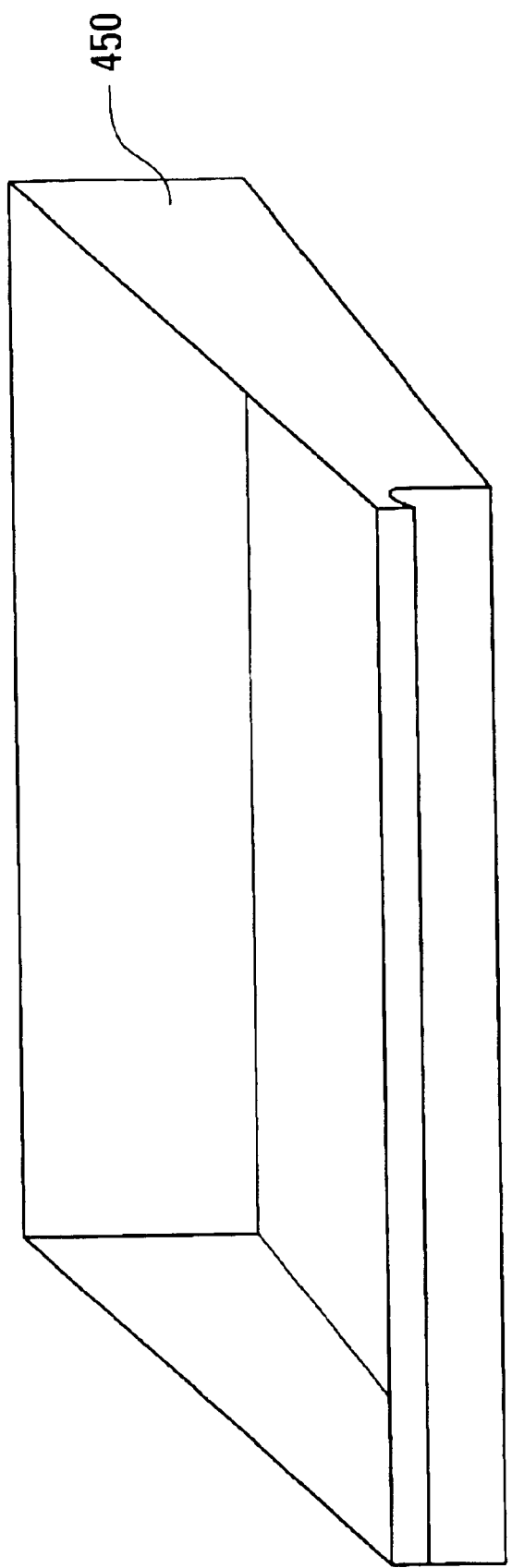
FIG. 4B is a perspective view of a molded membrane basin liner, according to one embodiment of the present invention.

As previously indicated, the membrane 110 may be formed from an extruded sheet (FIG. 4A) or be molded into a preformed shape (FIG. 4B). Turning to FIG. 4A, a perspective view of an extruded membrane sheet 405 used to form the basin lining membrane 110 is provided which indicates the forming processes for fitting the extruded material into a shape to line the solar distillation system basin 105. In a preferred embodiment, the extruded membrane sheet 405 is made of a food grade black silicone, for example Dow Corning 40, and extruded in a rectangular sheet large enough to completely cover the inside of the solar distillation system basin 105 when folded or cut to the shape and size of the basin 105. Although, the membrane 110 may be made of other materials that have characteristics such as being non-toxic, odorless, malleable, impermeable, food grade, and UV resistant. The four sides of the rectangular sheet 405 may be folder 90 degrees as shown by 410A–410D, to make perpendicular sides to coincide with the sides of the basin 105. As indicated by the dashed lines 420A and 420B, two ends of the extruded sheet 405 may be cut to match the slope of the two sloped side walls of the basin 105. The corners 415A–415D may be cut out at the dotted lines or simply folded over so as to form a squared corner of the membrane 110 to form fit inside the squared corner of the basin 105. The folded material of the membrane sheet 405 may be folded toward the inside or outside surface of the membrane 110 corners at, for example, the dotted lines including diagonal line 425. These corner folds may be adhesively attached to the perpendicular walls of the membrane 110 or the walls of the basin, using for example, a silicone such as Dow Corning 999-A. If the corners are cut out then the sides may be connected together with, for example, an adhesive so as to make a sealed membrane 110 which is form fitted to the basin 105. This adhesive may be, for example, a silicone such as Dow Corning 999-A. The membrane may be made of any thickness as long as it is sufficiently durable for installation and use and malleable enough to lie close to the contour of the basin. In one preferred embodiment the membrane may be in the range of 0.010 to 0.150 inches thick for example, 0.025 inches thick. Further, in one variation the Dow Corning 40 silicone may have FDA ingredients per CFR 177.2600.

Another method of making the impervious membrane 110 is using a molding process. FIG. 4B is a perspective view of such a molded membrane basin liner according to one embodiment of the present invention. As illustrated, the molded method eliminates the need for manually shaping the membrane material to fit into the basin 110, which can save assembly time and improve the integrity of the membrane 110.

A still further method of making the impervious membrane 110 is spraying the material onto the basin 105. The membrane material to be sprayed on, for example silicone, could be in liquid form and applied with air pressure in a manner similar to spray painting. Alternatively, the material could be contained in a gas pressurized or aerosol can and may thus be easily applied on-site. This approach may be most beneficial if the solar power distillation system is shipped to location in kit form and assembled on site.

Figure 5:
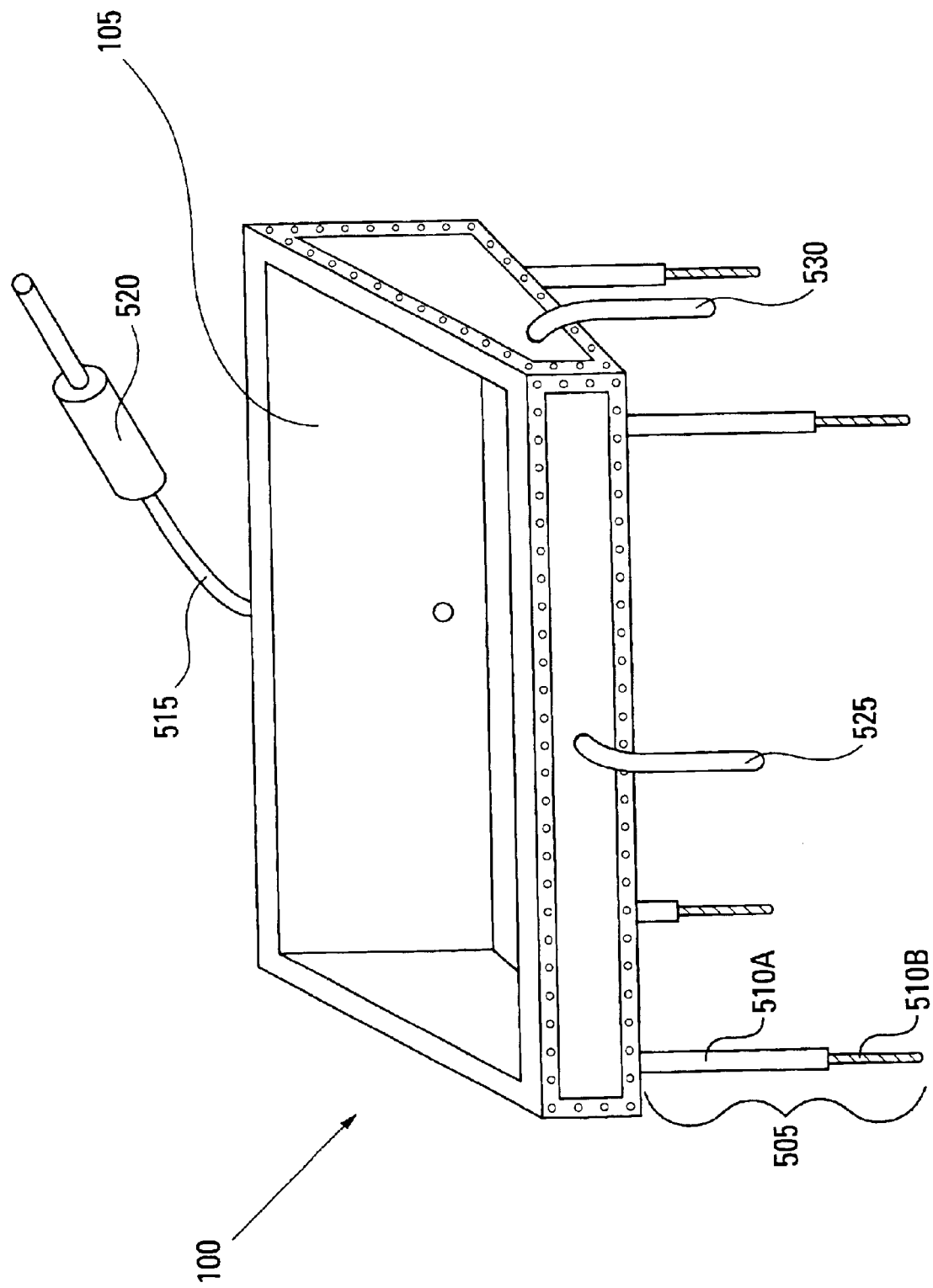
FIG. 5 is a perspective view of another exemplary solar powered distillation system, according to another embodiment of the present invention.

Referring now to FIG. 5, another exemplary solar powered distillation system 100 according to the present invention will be described. In this embodiment, the solar power distillation system includes legs, various inlet and outlet ports with tubes, and a carbon filter. First, adjustable legs 505, preferably four legs, are provided so that the basin 105 may be easily set up and leveled for maximum distillation efficiency. The adjustable legs 505 may include a first section 510A and a second section 510B with which associated with one another so that the combination allows for adjustable leg length. In a preferred embodiment the second section 510B may be threaded and screw in and out of the first section 510A. Of course the sections and their respective operations could be reversed. In another embodiment, the adjustable legs may have two or more sections that slide in and out of one another and use a friction based locking mechanism to set and secure the length. The legs 505 may also be folding legs so that they may be folded parallel to the underside of the still 100 basin for convenient shipping, carrying, and storage. Alternatively the legs 505 may be affixed to the basin with a quick disconnect bracket.

The solar powered distillation system may also include an inlet port and hose 515, an overflow outlet port and hose 525, and an outlet port and hose 530. The hoses may be made of a flexible silicone based material and be food grade. Further, a carbon filter 520 may be provided on the inlet port 515 or the outlet port 530 so as to filter out VOCs that may not be completely removed during the distillation process. The carbon filter will remove volatile organic compounds (VOCs) such as pesticides and petroleum distillates from, for example, a source water supply or distilled water output by the system. In a preferred embodiment the carbon filter 520 is connected to the inlet port and hose 515.

Figure 6:
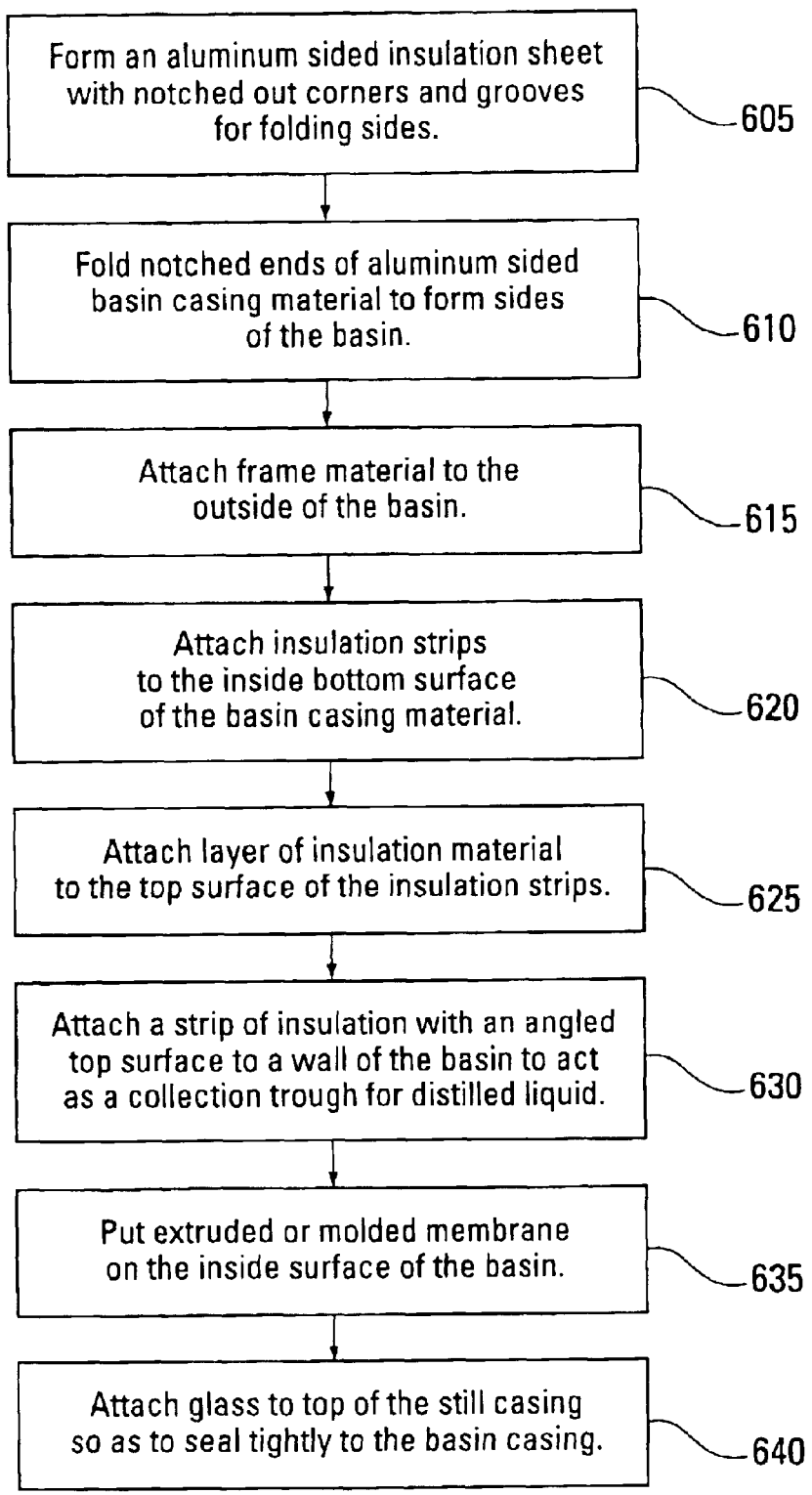
FIG. 6 illustrates a flow chart of one method for assembling a solar powered distillation system, according to one variation of the present invention.

Referring now to FIG. 6, one method of assembling a solar powered distillation system according to one variation of the present invention will be explained. First, at step 605, an aluminum sided insulation sheet 300 is formed to have corner notches and grooves for folding up side panels (see FIGS. 3A and 3B). Next, in step 610, the ends of the sheet 315A–315D are folded up, preferably perpendicular to the rest of the sheet, to form the sides of a solar power still basin casing 108. Then, in step 615, a structural framing 120 is attached to the outside corners of the aluminum sided basin casing to complete the basin casing 108. Next, in step 620, one or more insulation strips 205 are attached to the bottom inside surface of the basin casing 108. Then, at step 625, a sheet of insulation 215 is attached to the one of more insulation strips 205. Of course, inclusion of the insulation strips 205 is not necessary and this step could be eliminated in one variation of the invention. In either case, next at step 630 a collection trough is created by attaching a strip of preferably insulation material having either straight or angled top edge, to the shorter side wall inside surface of the basin casing 108. The collection trough will collect distilled liquid and channel it to an output port. Then, at step 635, the extruded or molded membrane 110 is placed on the inside surfaces of the basin casing 108 to act as a liner. The membrane 110 may be attached to the inside surfaces of the basin casing 108 using, for example, a silicone material such as Dow Corning 999-A. Next, at step 640, a glass panel is attached to the top of the still so as to seal the basin for efficient operation. The glass may be attached to the basin by using, for example, a bead of silicone, a rubber seal and locking mechanisms, or any other sealing method.

Figure 7:
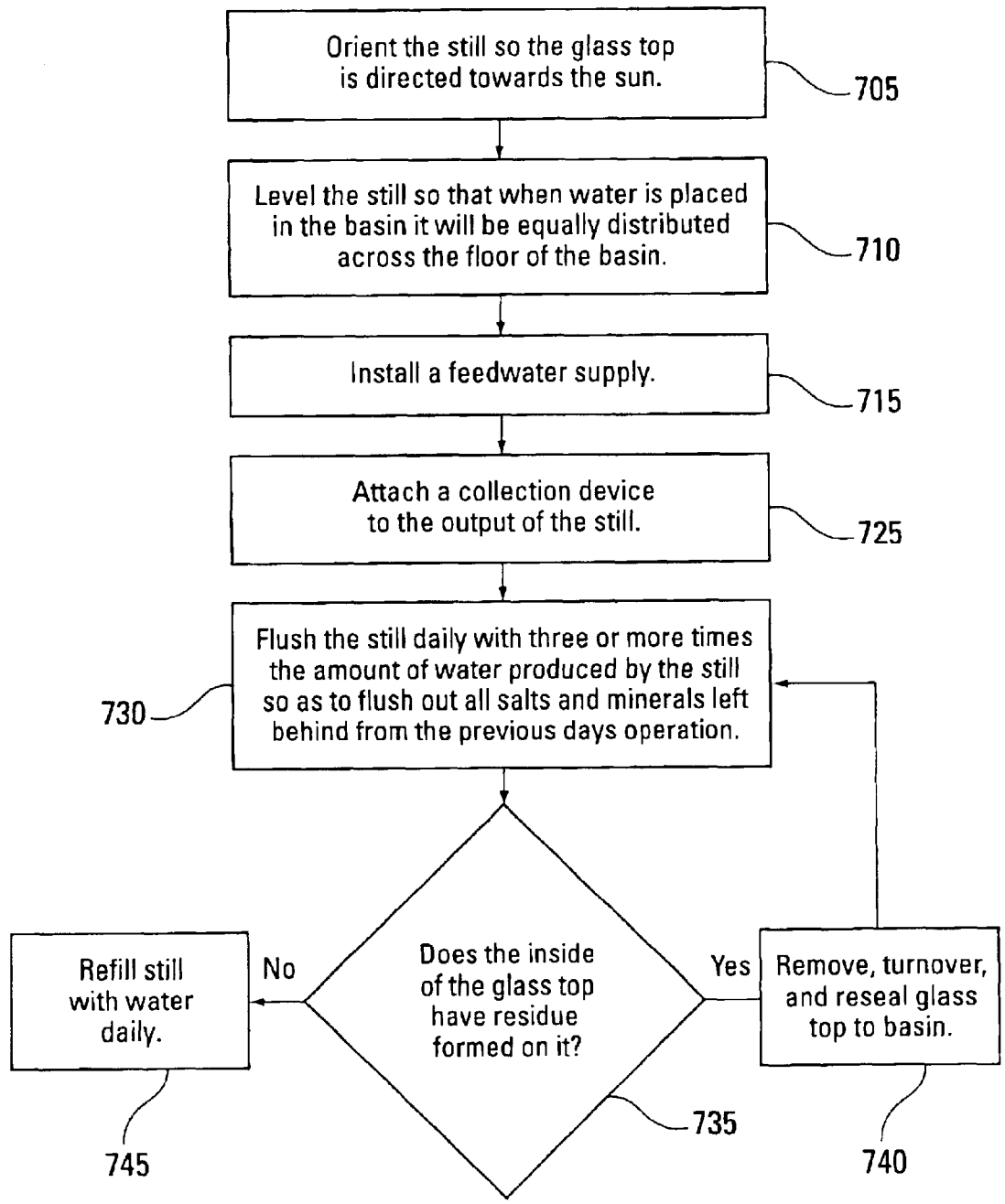
FIG. 7 illustrates a flow chart of one method of operating a solar powered distillation system, according to one variation of the present invention.

As discussed above, the invention may be used for distilling water to produce safe drinking water. One exemplary method for operation the solar powered distillation system for distilling drinking water is shown in FIG. 7. A solar still operates on the same mechanism that produces rainwater: evaporation. The solar powered distillation apparatus may be operated by introducing water into the inlet and recovering distilled water from the outlet. First, in step 705, for maximum output the still 100 should be place in a location receiving a maximum amount of sun and oriented to direct the angled glass top towards the sun. Next, in step 710, the still 100 should be leveled so that when the water is put in the still basin 105 the water covers the bottom of the basin 105 equally in all locations. This will also help to maximize distillation output. Next, at step 715, a feedwater supply is introduced into the still via an input port. The feedwater supply may be a bucket or other container attached to an inlet hose or a garden hose with pressurized water connected to the inlet hose. The feedwater is often times manually inputted using a container and is not required to be pressurized. Then at step 725, a collection device is connected to an output port, preferable via a silicone hose.

Once the system is flushed, the water to be cleaned is poured into the still 100 to partially fill the basin 105. The glass cover allows the solar radiation (short-wave) to pass into the still 100, which is mostly absorbed by the blackened base. The water begins to heat up and the moisture content of the air trapped between the water surface and the glass cover increases. The base of the membrane 110 also radiates energy in the infra-red region (long wavelength) which is reflected back into the still 100 by the glass cover. Thus the glass cover traps the solar energy inside the still 100. The heated water vapor evaporates from the basin and condenses on the underside of the glass cover. The condensed water trickles down the inclined glass cover to an interior collection trough and is delivered to the collection device which may be, for example, a glass storage bottle. This procedure should be followed each day.

Next, at step 730, each day the still should be flushed with approximately three or more times the amount of water produced by the still daily to remove various salts and minerals left behind in the still from the previous days operation. Then, at decision step 735, it is determined whether the inside of the glass top has a residue formed on it. If the glass appears cloudy and the amount of distilled water production is less then normal it is likely that a residue has formed on the inside of the glass. This residue may cause resistance to the flow of condensed water along the glass top to the collection trough. If so, then large condensation droplets form along the glass top and fall back into the basin 105 before reaching the collection trough. If this occurs, then at step 740 the glass top is removed, turned over, and resealed to cover the basin 105. If not, then at step 745, the still 100 is refilled with water to be distilled.

Although a particular embodiments of the present invention have been shown and described herein, it will be understood that it is not intended to limit the invention to the preferred embodiments and it will be obvious to those skilled in the art that various changes and modifications may be made without departing from the spirit and scope of the present invention. Thus, the invention is intended to cover alternatives, modifications, and equivalents, which may be included within the spirit and scope of the invention as defined by the claims.

All publications, patents, and patent applications cited herein are hereby incorporated by reference in their entirety for all purposes.

What is claimed is:

1. A system, comprising:
    a solar powered distillation system including;
        a basin; and
        an extruded impermeable nonporous black silicone membrane for containment, said membrane lining the basin, wherein the membrane is an extruded sheet cut, folded and adhesively attached to an inside surface of the basin so as to provide containment of a material to be distilled during distillation.

2. The system of claim 1, wherein the basin includes an insulation layer.

3. The system of claim 1, wherein the basin includes an insulation layer coupled to, bonded or adhesively attached to an outer protective casing.

4. The system of claim 3, wherein the membrane lines the basin so as to form with the basin a containment floor and containment sides of the basin.

5. The system of claim 4, further comprising:
    adjustable leas attached to said solar powered distillation system for supporting and horizontally leveling the basin so that when material to be distilled is placed in the distillation system it is equally distributed across the containment floor of the basin.

6. The system of claim 5, further comprising:
    a carbon filter for removing volatile organic compounds and couple to an inlet port or an outlet port of said solar powered distillation system.

7. The system of claim 1, wherein the silicone is U.S. Food and Drug Administration (FDA) food grade approved.

8. A system, comprising:
    a solar powered distillation system including;
        a basin; and
        a molded impermeable nonporous black silicone membrane for containment, said membrane lining the basin, wherein the membrane is molded to line and form fit inside surfaces of the basin.

9. The system of claim 8, wherein the basin includes an insulation layer.

10. The system of claim 9, further comprising:
    adjustable legs attached to said solar powered distillation system for supporting and horizontally leveling the distillation system so that when material to be distilled is placed in the distillation system it is equally distributed across a containment floor of the distillation system.

11. The system of claim 8, wherein the silicone is U.S. Food and Drug Administration (FDA) food grade approved.

12. A system, comprising:
    a solar powered distillation system including;
        a basin; and
        a sprayed-on impermeable nonporous black silicone membrane for containment, said membrane lining the basin, wherein the membrane is sprayed-on silicone that adheres to and lines inside surfaces of the basin.

13. The system of claim 12, wherein the basin includes an insulation layer.

14. The system of claim 13, further comprising:
    adjustable legs attached to said solar powered distillation system for supporting and horizontally leveling the distillation system so that when material to be distilled is placed in the distillation system it is equally distributed across a containment floor of the distillation system.

15. The system of claim 12, wherein the silicone is U.S. Food and Drug Administration (FDA) food grade approved.

16. A solar powered distillation system, comprising:

a basin formed of an aluminum sided insulation sheet including an outside aluminum layer and an inside insulation layer bonded together, the aluminum layer being sufficiently thick to provide structural rigidity and durability as an outside surface of the basin;

a membrane for containment that lines the basin and covers the insulation layer inside the basin; and adjustable legs attached to said basin, said adjustable legs for supporting and leveling the distillation system to optimize the solar powered distillation system efficiency, wherein the membrane is an extruded, sprayed-on, or molded impermeable membrane lining said basin.

17. The solar powered distillation system of claim 16, further comprising:

a carbon filter attached to an inlet or outlet of said solar powered distillation system for removing various impurities.

18. The solar powered distillation system of claim 17, wherein the membrane is comprised of extruded, molded or sprayed-on impermeable silicone.

19. The solar powered distillation system of claim 16, wherein the insulation layer is made of polyisocyanurate.

20. The solar powered distillation system of claim 19, wherein the aluminum layer is bonded to the polyisocyanurate insulation layer to form an integral sheet with structural rigidity and strength.

21. A solar powered distillation system, comprising:

a basin for containment of a substance to be distilled, the basin including:

an outer protective shell made of a structurally rigid and durable material; and at least one layer of insulating material formed over and attached to an inner surface of the outer protective shell; and an extruded, molded or sprayed-on impermeable nonporous silicone membrane placed over and attached to the at least one layer of insulating material so as to form a lining inside the basin; and a transparent member for solar ray admission, the transparent member placed over and coupled to the basin so as to form with the basin a solar evaporation chamber of the solar powered distillation system.

22. The solar powered distillation system of claim 21, wherein the membrane is an extruded silicone sheet that is cut, folded and adhesively attached to the at least one layer of insulating material.

23. The solar powered distillation system of claim 22, wherein the membrane is adhesively attached to the at least one layer of insulating material and sealed at corners of the basin with silicone.

24. The solar powered distillation system of claim 21, wherein the membrane is molded silicone that has been molded to fit a shape of the insulating material.

25. The solar powered distillation system of claim 21, wherein the membrane is formed by spraying silicone over the at least one layer of insulating material.

* * * * *

UNITED STATES PATENT AND TRADEMARK OFFICE
CERTIFICATE OF CORRECTION

PATENT NO.        : 6,767,433 B2                                                    Page 1 of 1
APPLICATION NO.   : 09/845359
DATED             : July 27, 2004
INVENTOR(S)       : Robert E. Foster, Michael J. Cormier and Gregory R. Vogel It is certified that error appears in the above-identified patent and that said Letters Patent is hereby corrected as shown below:

Title Page, item (56), column 1, under the header U.S. PATENT DOCUMENTS: insert
--3,655,517 4/1972 Hensley et al. .....202/234--
--3,930,958 1/1976 Maruichi, Nobuo ..... 202/174-- --4,279,244 7/1981 McAlister, Roy E. ..... 126/621--
--5,098,220 3/1992 Norman, Carol A. ..... 405/52-- --5,598,661 2/1997 Elderman et al. ..... 47/48.5--
--5,650,050 7/1997 Kaufmann, Willy ..... 202/234-- --6,063,995 5/2000 Bohland et al. ..... 136/243--
new header --FOREIGN PATENT DOCUMENTS-- --2604978 3/1977 Smith Germany-- --3339898 11/1983 Coden Germany--

Signed and Sealed this

Twenty-fourth Day of August, 2010

David J. Kappos
*Director of the United States Patent and Trademark Office*

UNITED STATES PATENT AND TRADEMARK OFFICE
CERTIFICATE OF CORRECTION

PATENT NO. : 6,767,433 B2
APPLICATION NO. : 09/845359
DATED : July 27, 2004
INVENTOR(S) : Robert E. Foster, Michael J. Cormier and Gregory R. Vogel Page 1 of 1

It is certified that error appears in the above-identified patent and that said Letters Patent is hereby corrected as shown below:

Title Page, item (56), column 1, under the header U.S. PATENT DOCUMENTS: insert new header --OTHER PUBLICATIONS-- --ROBERT FOSTER AND MIKE CORMIER, "Solar Still Construction and Operation," El Paso Solar Energy Association (El Paso, Texas), (Summer 1999).-- after "6,440,275 B1* 8/2002 Domen .... 202/234"

Signed and Sealed this
Thirty-first Day of May, 2011

David J. Kappos
*Director of the United States Patent and Trademark Office*